(12) United States Patent
Kheraj

(10) Patent No.: US 12,705,645 B2
(45) Date of Patent: Aug. 11, 2026

(54) MULTIMEDIA APPARATUS FOR A VEHICLE

(71) Applicant: Reshma N. Kheraj, Raleigh, NC (US)

(72) Inventor: Reshma N. Kheraj, Raleigh, NC (US)

( * ) Notice: Subject to any disclaimer, the term of this patent is extended or adjusted under 35 U.S.C. 154(b) by 0 days.

(21) Appl. No.: 18/420,427

(22) Filed: Jan. 23, 2024

(65) Prior Publication Data

US 2024/0265425 A1 Aug. 8, 2024

Related U.S. Application Data

(60) Provisional application No. 63/444,115, filed on Feb. 8, 2023.

(51) Int. Cl.

| | |
|---|---|
| ***G06Q 30/00*** | (2023.01) |
| ***B60Q 1/50*** | (2006.01) |
| ***G06Q 30/0251*** | (2023.01) |
| ***G09F 9/30*** | (2006.01) |
| ***G09F 21/04*** | (2006.01) |
| *G05B 19/418* | (2006.01) |

(52) U.S. Cl.
CPC ....... *G06Q 30/0266* (2013.01); *B60Q 1/5037* (2022.05); *G09F 9/30* (2013.01); *G09F 21/048* (2013.01)

(58) Field of Classification Search
CPC ........... G06Q 30/0266; G06Q 30/0265; B60Q 1/5037; G09F 21/048; G09F 21/04
See application file for complete search history.

(56) References Cited

U.S. PATENT DOCUMENTS

| | | | | |
|---|---|---|---|---|
| 10,783,559 | B1 * | 9/2020 | Tran | H04W 4/40 |
| 2014/0310103 | A1 * | 10/2014 | Ricci | G08B 25/016 705/14.62 |
| 2020/0223444 | A1 * | 7/2020 | Bonanni | G06V 20/597 |
| 2021/0356279 | A1 * | 11/2021 | Szigeti | G01C 21/3407 |
| 2022/0191469 | A1 * | 6/2022 | Haskin | H04N 17/002 |

OTHER PUBLICATIONS

"Connected Automobiles". IEEE. 2020. (Year: 2020).*
"Rapidly Deployable Video Analysis Sensor units for wide area surveillance". IEEE. 2010 (Year: 2010).*

* cited by examiner

*Primary Examiner* — Maria V Vanderhorst
(74) *Attorney, Agent, or Firm* — Patent 360; Barry Choobin

(57) ABSTRACT

An apparatus and method for presenting information, such as advertisements to the public through a vehicle. The apparatus includes a client unit for a vehicle and a system that can couple to the client unit remotely. The client unit includes a large display that can be mounted to the vehicle. A control unit that connects to the system for receiving information for presenting the display. The system can receive the current location of the vehicle and transmit content related to the current location to the control unit for display. The control unit can also include cameras to capture the surroundings of the vehicle, and the same can be used by virtual/immersive reality applications.

4 Claims, 3 Drawing Sheets

MULTIMEDIA APPARATUS FOR A VEHICLE

CROSS-REFERENCE TO RELATED APPLICATIONS

This application claims priority from a U.S. provisional patent application Ser. No. 63/444,115, filed on Feb. 8, 2023, which is incorporated herein by reference in its entirety.

FIELD OF INVENTION

The present invention relates to a multimedia apparatus for a vehicle, and more particularly, the present invention relates to an apparatus that can display content on a large screen and capture video of surroundings. Also, the present invention relates to immersive mixed and virtual reality.

BACKGROUND

Advertisement is a primary means of informing the public about a product, brand, or service. Advertisements are made to attract the interest of the public to a product, brand, or service. Advertisements are made to potential buyers or consumers of goods and services. Making and publishing the advertisements itself is a multibillion-dollar industry.

There is always an industry need to find new and efficient means of advertisement.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a multimedia apparatus for vehicles for displaying advertisements to the public at large.

It is another object of the present invention that the multimedia apparatus has added functionality.

It is still another object of the present invention that targeted advertisements can be made based on geographical location.

It is yet another object of the present invention that the advertisements can be dynamically updated and displayed.

It is an additional object of the present invention that the system can provide an additional source of income.

In one aspect, disclosed is an apparatus comprising a display configured to be mounted to a vehicle, the display configured to present information, the information comprises advertisements; a control unit configured to be coupled to a power supply of the vehicle and the display, the control unit configured to operate the display; and a system operably coupled to the control unit. The client unit further comprises one or more cameras configured to be mounted to the vehicle and configured to capture video data of the surroundings of the vehicle, the system configured to receive the video data. The system is remote to the client unit and coupled through a wireless network. The control unit comprises a GPS circuitry, the control unit is configured to determine the current location of the vehicle, the system configured to receive the current location from the client unit is near real-time, the system is configured to transmit the information to the client unit based on the current location and the control unit is configured to present the received information on the display.

In one aspect, disclosed is a method of presenting information to the public using a vehicle, the method comprising providing an apparatus comprising a display configured to be mounted to the vehicle, the display configured to present information, the information comprises advertisements, a control unit configured to be coupled to a power supply of the vehicle and the display, the control unit configured to operate the display, and a system operably coupled to the control unit. The method comprises mounting the client unit on the vehicle, such that the display is visible to people from outside of the vehicle and connecting the client unit to the system. The client unit further comprises one or more cameras configured to be mounted to a vehicle and configured to capture video data of the surroundings of the vehicle, the system configured to receive the video data, the method comprises capturing video data of the surroundings; and receiving the video data by the system from the client device. The system is remote to the client unit and coupled through a wireless network. The control unit comprises GPS circuitry, the control unit is configured to determine a current location of the vehicle, the system configured to receive the current location from the client unit is near real-time, the system is configured to transmit the information to the client unit based on the current location and the control unit is configured to present the received information on the display, the method further comprises detecting a current location of the vehicle by the control unit; receiving the current location by the system from the client unit in near real-time; transmitting content by the system to the client unit, wherein the content is related to the current location of the vehicle; and displaying the content on the display by the control unit.

BRIEF DESCRIPTION OF DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Disclosed is a multimedia apparatus for displaying advertisements to the public at large. Moreover, the disclosed multimedia apparatus can capture data for virtual and mixed-reality environments. The disclosed multimedia apparatus allows the use of vehicles for displaying the advertisements and the advertisement can be displayed to the public while the vehicle moves on the road when going from one place to another. The vehicle owners can have additional sources of income using the disclosed apparatus.

Figure 1:
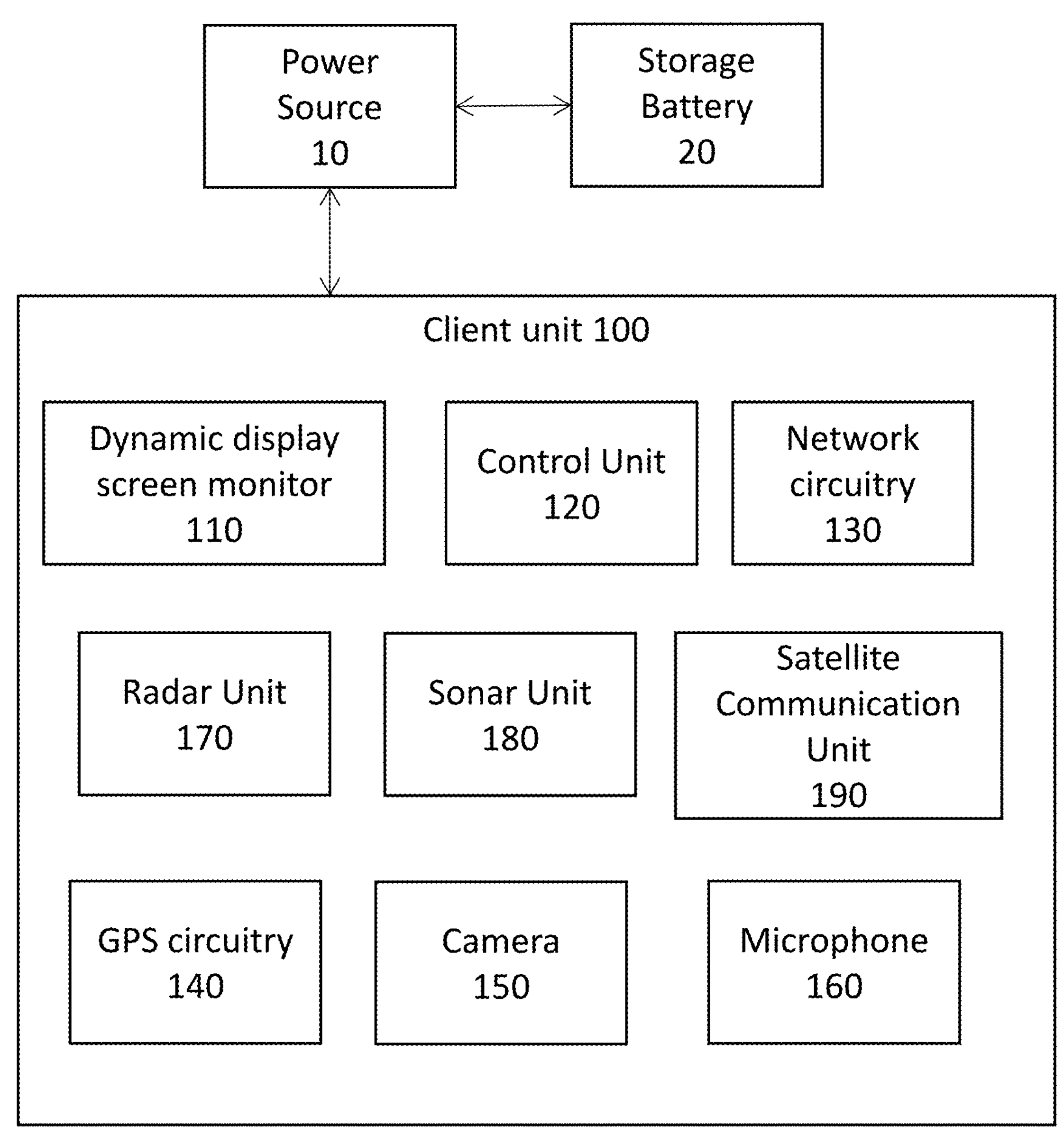
FIG. 1 is a block diagram showing the architecture of a client unit of the multimedia apparatus, according to an exemplary embodiment of the present invention.

Referring to FIG. 1 which is a block diagram showing an architecture of a client unit of multimedia apparatus. The multimedia apparatus includes a client unit that can be installed in a vehicle. The vehicle can be a private, a public vehicle, a passenger vehicle, or a commercial vehicle. Examples of the vehicle include cars, trucks, taxis, trains, buses, and the like.

Figure 3:
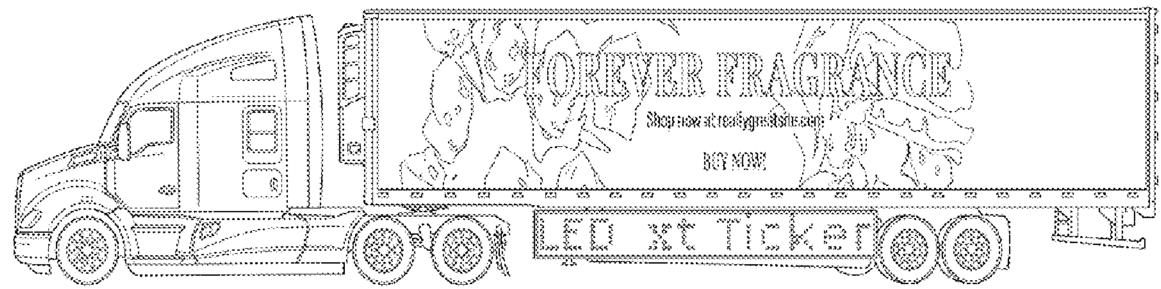
FIG. 3 shows a side of a truck having the disclosed display, according to an exemplary embodiment of the present invention.

The client unit includes a display 110 for displaying advertisements to the public. Display 110 can be a size sufficient to show the advertisement to people near the vehicle. For example, people alongside the road on which the vehicle is passing can view the advertisement. The display can be mounted to a vehicle. The display can be mounted outside the vehicle or inside the vehicle such that the display is visible to people from outside of the vehicle. FIG. 3 illustrates the display mounted to the side of a truck.

Preferably, the display can be weather-resistant to prevent any damage from dust, sunlight, and water. Client unit 110 can also be used in emergencies to display information. For example, during active flooding in the area, all trucks with this device installed can show affected areas and can be used to map out flooding zones and emergency routing.

The client unit may further include a control unit 120 that can be operably coupled to the display. The control unit can include suitable processing circuitry that can display content on the display. The controller can convert data stored in the memory to video content that can be presented on the display. For example, suitable graphic processing circuitry can be used to generate a video stream that can be presented on the display. Advertisements can be stored in the memory of the control unit. Also, configuration files that include instructions to play advertisements according to predefined rules can be stored in the memory of the control unit. The control unit can use configuration files to play the advertisement. It is to be noted that both the advertisements and configuration files stored in the memory can be dynamically updated through a network connection.

The disclosed control unit can also include a network circuitry for connecting to a central system of the disclosed apparatus. Through the network circuitry 130, the disclosed control unit can connect to a network for uploading data and downloading data. The network can be any suitable network known to a skilled person and any such network is within the scope of the present invention. For example, the network can be a cellular network, LTE network, Satellite network, and the like.

The controller may also include a GPS circulatory 140 that can detect the current location of the vehicle and the same can be used for location-based targeted advertisements. The current location can be transmitted to the central system that can update the controller with advertisements for the current location.

The client unit may also include one or more cameras 150 that can be mounted to a display housing or the vehicle body such as to capture videos of the surroundings of the vehicle. The captured video can be transferred to the central system. A microphone 160 can also be included to capture audio near the vehicle. This can be useful in emergencies to record what is happening in the area.

The client unit may also include a radar unit 170 to determine the distance (ranging), angle (azimuth), and radial velocity of objects relative to the site. Also, the client unit contains SONAR unit 180 for exploring and mapping the ocean. The SONAR data can be integrated with GPS and audio & video data to map and navigate in water. This may also provide enhanced mapping/navigation on water. Also, the SONAR unit can be used for self-navigation on water. A satellite communication unit 190 (Antenna, Dish, and the like) can also be incorporated to receive and transmit information to/from other satellites and compatible devices and technologies.

The satellite data and Audio/Video data from the device or network can be synchronized to form 360-degree and/or 3D satellite views in real-time or offline. This data can be used to create 3D virtual tours and/or live 3D views and/or 3D virtual tunnels and/or 3D simulations on the land, on the water, and/or in the sky. Also, network combination between the vehicles/devices in the air, on the water, and the land.

The satellite system can communicate with all other satellite systems and or compatible devices and/or software and can form a network to enhance and broaden the range of communication.

Example: All nearby vehicles, buildings, etc. with this device installed or with compatible devices/technologies and software's can form a network through all available secured/unsecured protocols and enable communication among this network, communication can also be restricted between devices through various protocols among the networks.

For example, the satellite unit from this client unit 110 installed on planes can form networks and in turn, can communicate with Satellite Ground Stations (SGS). Usually, planes in the middle of oceans lose contact with ground ATC (Air Traffic Controller). The disclosed network of devices can widen the range of communication in the air and from air to ground stations/Communication stations on water to ensure the safety and communication of planes, same applies to land and water.

The disclosed client devices can be used as moving/stationary Satellite ground stations (SGS) or Satellite Flying Station or can be integrated or can communicate with other satellite ground stations (SGS) and/or satellites and/or devices and/or Software. The data can be synchronized between multiple vehicles, satellites, and stations.

Client devices can be integrated with FDR (Flight Data Recorder) and/or CVR (Cockpit Voice Recorder) for live feeding of flight data and voice data.

Client devices can be used for Military (Surveillance, Combat, etc.), commercial, public, private, and personal. The collected data can be used for self-driving, self-flying, and self-navigation on water or on land and rails. Moreover, the client devices can be used as Television. It can be used for 360-degree Video/Audio capture of surroundings. The client device can also project holograms. The client device can be used as a projector. Cameras of the client device may be capable of zooming and focusing on desired objects. A digital ticker or additional monitor (client unit) can be added at the bottom of the trailer, as shown in FIG. 3. This can be helpful in emergencies. It is to be noted that the client unit/device 100 can be an integral part of the trailer/truck/any vehicle itself, comprising to smart vehicle.

Figure 2:
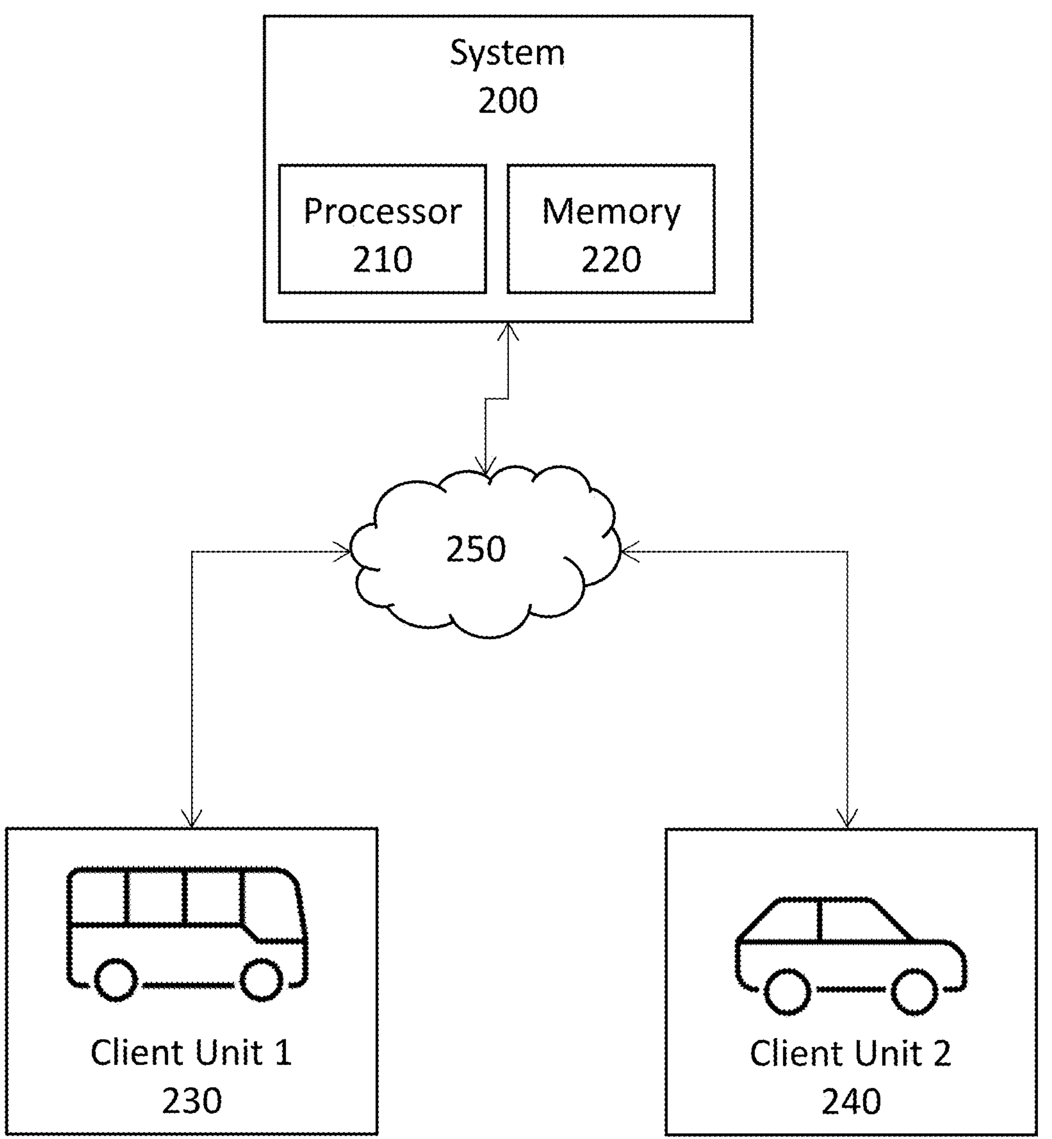
FIG. 2 is a block diagram showing the architecture of the multimedia apparatus and the environment of the apparatus, according to an exemplary embodiment of the present invention.

Referring to FIG. 2 which shows the architecture of system 200. The system 200 includes a processor 210 and a memory 220. The processor can be any logic circuitry that responds to, and processes instructions fetched from the memory. The memory may include one or more memory chips capable of storing data and allowing any storage location to be directly accessed by the processor. The memory may include modules according to the present invention for execution by the processor to perform one or more steps of the disclosed methodology.

The system can connect to and control different client units that are installed in respective vehicles. Advertisements or any other information to be displayed can be configured in the system. The system can be implemented in the form of a server, and the term server includes cloud servers. The system can be implemented in one or more servers which can be deployed at one location or geographically dispersed.

FIG. 2 shows the system 200 connected to two client units i.e., client unit 1 230 and client unit 2 240 through network 250. The drawing shows system connected to client units is for illustration only, the system can connect with one or more client units simultaneously and at different times. The structure and functioning of networks are known in the art.

The control unit can be any computing device that can display video/audio data and can capture video/audio. The computing device can be attached or embedded in any vehicle. The control unit can connect to the system of the apparatus through the network. It is to be noted that the control unit can be retrofitted, removed, and replaced. The client unit/device can be attached or embedded to any vehicle, this device can be detached if necessary or as needed.

The control unit can be powered by the power source 10 and battery 20 of the vehicle. The power source can also be a solar panel mounted to the respective vehicle. Any other suitable type of power source is within the scope of the present invention.

In certain implementations, the display can be placed on the sides of trucks, trailers, buses, vans, trains, or any other vehicles, or anything that moves in the sky, on the land, or on the water to advertise products or general advertising or any other purpose while the vehicle is on the move or parked. Video and audio recording of surroundings by using an embedded camera and microphone in the screen itself. In each vehicle, more than one display can be installed for displaying information in all combinations.

The disclosed system is advantageous in that it allows for utilizing the space and circumference of the vehicle for displaying content while the vehicle is moving or parked. This helps to advertise products and/or any other content, such as alerts or emergencies to a broader audience while the vehicle is moving or parked. It is understood that the above embodiments are described for advertisement, however, the display can be used to present any information to the public.

In certain implementations, the system can track the client units and thus the respective vehicles for safety, billing, surveillance, and the like.

In certain implementations, the data can be streamed in near real-time by the system to the client units through a suitable network.

In certain implementations, the client unit can be mounted to any supporting structure such as buildings, street poles, and the like. The disclosed apparatus can replace static advertisements with dynamic digital advertisements. For example, company X owns/leases one thousand semi-trucks that can run commercial content across the globe. The client units can be installed on these trucks and based on the current locations of these trucks; dynamic advertisements can be made by the system.

In certain implementations, the client unit can record audio and video of the vehicle's surroundings for many purposes like surveillance of the trucks, real-time GPS/Video tracking, and monitoring of the valuable cargo. The video/audio data obtained from the client units can be used to create 3D tunnels for virtual, alternative, mixed, or any other realities. The data can be used for many other purposes. The data can be tagged with GPS data. This data can be used to create virtual tours of places or virtual driving/self-driving experiences, 3D road maps, etc.

The disclosed apparatus may offer additional applications, such as use for traffic signs, and static & dynamic traffic regulation. The disclosed apparatus can be used for electronic toll, speed monitoring, and vehicle registration monitoring (scanning, reading, and retrieving data using vehicle registration numbers). The disclosed apparatus can also be used for tracking and monitoring of targeted registered vehicles (useful in cases of child abduction, traffic violations, criminal tracking, etc.)

Also, it is to be noted that various artificial Intelligence technologies can be incorporated without departing from the scope of the present invention.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A distributed sensor-fusion and dynamic multimedia apparatus comprising:

a plurality of client units for a plurality of vehicles, wherein each client unit comprises:

a display configured to be mounted outside of a vehicle, the display is weather resistant that prevents any damage to the display from dust, sunlight, and water, the display is of a large size such the content on the display is visible to public in large outside the vehicle; and a control unit comprising a processing circuitry and configured to be coupled to a power supply of the vehicle and the display, wherein the control unit is configured to operate the display, wherein the controller is configured to process data stored into a memory to video content for presenting on the display, wherein the control unit comprises:

a GPS circuitry for detecting current location of the vehicle and generate GPS data;

one or more cameras configured to be mounted to the display and a body of the vehicle, the one or more camera operably coupled to the control unit and generate video data;

one or more microphones configured to capture audio outside of the vehicle and generate audio data;

a radar unit configured to determine distances, angles, and radial velocity of objects relative to a site;

a SONAR unit integrated with GPS data, audio data, and video data; and a satellite communication unit configured to send and receive satellite data, wherein satellite data is synchronized with the audio data and video data, wherein the satellite communication unit is configured to generate a communication network; and a central system operably and remotely coupled to the plurality of control units through a network connection, wherein the control unit is configured to:

detect a current location of the vehicle through the GPS circuitry;

transmit the current location to the central system through the network; and receive data from the central system in near real time based on the current location.

2. The apparatus of claim 1, wherein the client unit is configured as a satellite ground stations or a satellite flying station, wherein the client unit is configured to communicate with other client units.

3. The apparatus of claim 1, wherein the client unit further comprises a projector configured to project holograms.

4. A method of presenting location specific information, surveillance, and generating virtual data, the method comprising:

providing an apparatus comprising:

a plurality of client units for a plurality of vehicles, wherein each client unit comprises:

a display configured to be mounted outside of a vehicle, the display is weather resistant that prevents any damage to the display from dust, sunlight, and water, the display is of a large size such the content on the display is visible to public in large outside the vehicle; and a control unit comprising a processing circuitry and configured to be coupled to a power supply of the vehicle and the display, wherein the control unit is configured to operate the display, wherein the controller is configured to process data stored into a memory to video content for presenting on the display, wherein the control unit comprises:

a GPS circuitry for detecting current location of the vehicle and generate GPS data;

one or more cameras configured to be mounted to the display and a body of the vehicle, the one or more camera operably coupled to the control unit and generate video data one or more microphones configured to capture audio outside of the vehicle and generate audio data;

a radar unit configured to determine distances, angles, and radial velocity of objects relative to a site;

a SONAR unit integrated with GPS data, audio data, and video data; and a satellite communication unit configured to send and receive satellite data, wherein satellite data is synchronized with the audio data and video data, wherein the satellite communication unit is configured to generate a communication network; and a central system operably and remotely coupled to the plurality of control units through a network connection, and mounting the plurality of client units on the plurality of vehicles, such that the display is visible to people from outside of the vehicle;

detecting a current location of each vehicle through the respective GPS circuitry;

transmitting the current locations to the central system through the network;

receiving advertising data by the respective vehicle in near real time from the central system based on the respective current location;

capturing the video data of the surroundings; and creating 3D tunnels and virtual tours by processing the satellite data, the video data, and the audio data for virtual, alternative, or mixed realities.

* * * * *